Figures 1, 2:
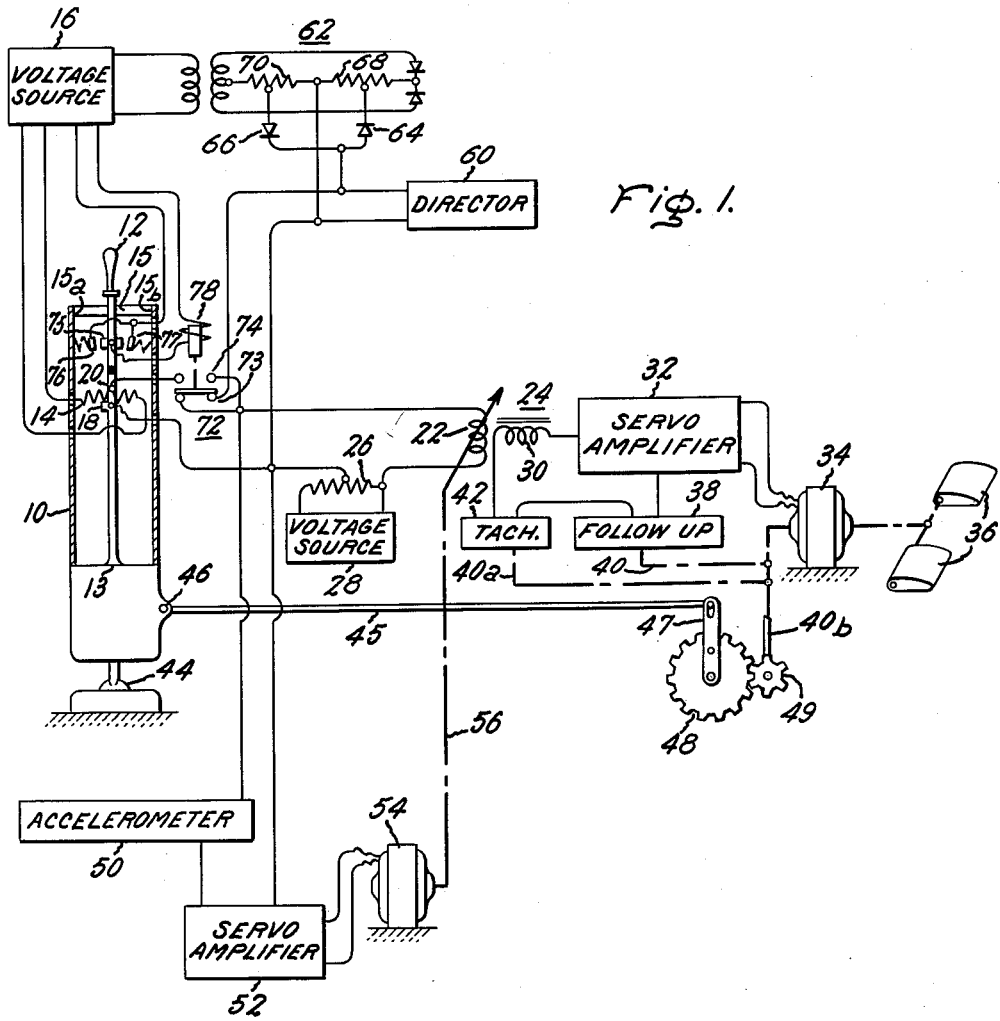

Inventor:
Michael F. Marx,
by Roe D McBurnett
His Attorney.

United States Patent Office 2,983,469
Patented May 9, 1961

2,983,469

MANEUVER LIMITER FOR AIRCRAFT

Michael F. Marx, Schenectady, N.Y., assignor to General Electric Company, a corporation of New York Filed Aug. 31, 1956, Ser. No. 607,310

10 Claims. (Cl. 244—77)

This invention relates to a maneuver limiter for aircraft and, more particularly, to a maneuver limiter which informs the human pilot of an aircraft, when manually controlling the aircraft, when he has reached the limited safe maneuver of which the aircraft is capable, and which prevents the automatic pilot, when engaged, from maneuvering the aircraft beyond its safe limit.

As is well known to all persons familiar with aircraft, all types of aircraft have a limit to the force or load which may be exerted on the various portions of the aircraft. The most critical limiting factor is the load that can be carried by the wings of an aircraft. When an aircraft is in flight its wings generate a lifting force that is equal to the weight of the aircraft multiplied by the sum of the gravitational pull on the aircraft and the acceleration force in the direction of gravity, expressed in terms of gravity or "$g$." In level flight these forces are considered equal to one, so that the lift equals the weight. However, where the aircraft is put through various maneuvers, such as pulling up from a dive, the added acceleration force is quite large, and in some instances the force exerted on the wings may exceed their limiting load, and literally tear the wings from the aircraft. At such times the human pilot is fortunate if he can escape with his life. In aircraft of prior days, the human pilot had a direct communication between his control stick and the control surface of the aircraft. Thus, he was able to "feel" the manual force necessary to place such control surfaces into position to perform a given maneuver. Of course, the greater the combined forces acting on the aircraft, and therefore, the greater the load built up on the wings, the more manual force the pilot had to exert on the control surface to perform the maneuver. This "feel" of the control stick enabled the human pilot to sense the beginning of an unsafe maneuver. Therefore, he was able to maneuver his aircraft within safe limits. However, with the advent of modern day aircraft, with their increased weight and speed, more and more manual force is required by the human pilot to execute the simplest maneuvers. For this reason it has become necessary to place boosters of various types between the control stick and the control surface to enable the human pilot to perform necessary maneuvers without taxing his strength. These boosters have taken away the human pilot's direct contact with the control surfaces and thus his natural "feel" in maneuvering the aircraft. Various artificial "feel" systems have been added to the control stick which provide the human pilot an adequate "feel" for simple maneuvering, but do not provide sufficient warning of unsafe maneuvering.

Present maneuver limiters in aircraft employ a complicated mechanical "feel" system. This system incorporates bob weights to control the stick force felt by the human pilot. The bob weights react to the maneuver according to the acceleration force on them, and this reaction is relayed to the control stick as a force. However, the bob weights do not increase the stick force until after the maneuver is established since it is only after the maneuver is established that the acceleration force is exerted on the bob weights. Thus the human pilot is not aware that he has passed the safe maneuvering point of his aircraft until after the unsafe maneuver has been established. Therefore, there is a great need for a maneuver limiter which will inform the human pilot of an aircraft that he is putting his aircraft in an unsafe maneuver prior to the establishing or execution of such unsafe maneuver. It is of course preferable to incorporate such limiter in the aircraft "feel" system.

In addition to the maneuvers that the human pilot executes by his manual control of the aircraft, modern aircraft have automatic pilots, which maneuver the aircraft without any action by the human pilot. For example, when the aircraft is flying at a given attitude with the automatic pilot engaged, any deviation of the aircraft from this attitude will be sensed by the automatic pilot and a correction signal will be sent to the appropriate control surface to return the aircraft to the given attitude. In some instances it is possible that the automatic pilot could exceed the safe maneuver limit of the aircraft. In such instances the human pilot would have no control of the maneuver and would not be aware of the dangerousness of the maneuver until it was already established. Thus, there is a need for a maneuver limiter that will prevent automatic pilots on aircraft from maneuvering the aircraft beyond its safe limits.

Therefore, it is a principal object of this invention to provide a maneuver limiter which will warn the human pilot having manual control of an aircraft of an unsafe maneuver before such unsafe maneuver is established.

An additional object of this invention is to provide a maneuver limiter as part of the artificial "feel" system of an aircraft which will warn the human pilot manually controlling the aircraft of an unsafe maneuver before it is executed.

It is a further object of this invention to provide a new and improved maneuver limiter in conjunction with a flight control system which will limit the signals of an automatic pilot to prevent the automatic pilot from maneuvering an aircraft beyond its safe limits.

A still further object of this invention is to provide a new and improved maneuver limiter which includes means to warn the human pilot when he is approaching an unsafe maneuver with his aircraft and means to prevent the automatic pilot from placing the aircraft in an unsafe maneuver.

In carrying out the invention in one form, means associated with the control stick of an aircraft are provided to impress a control or command signal on the servo which actuates one of the control surfaces of the aircraft. As a force is exerted on the control stick, which is operatively linked to the servo, the servo moves the control surface to maneuver the aircraft. The means associated with the control stick are so designed that a signal great enough to cause an unsafe maneuver of the aircraft cannot be developed. Therefore, should the pilot attempt to pull the control stick sufficiently to place the aircraft in an unsafe maneuver, the servo would not be energized by the signal to move the control surfaces to perform the unsafe maneuver. Instead, the human pilot would be required to exert additional force to manually operate the servo; this additional force would warn the human pilot that the maneuver attempted was unsafe before the maneuver was established.

When it is desired to also limit the signal from an automatic pilot means such that the aircraft cannot be placed in an unsafe maneuver a limiter is provided in the flight control system. This limiter is designed to reduce the signal from the automatic pilot means whenever such signal is of sufficient strength to cause an unsafe maneuver.

This invention will be better understood from the following description taken in connection with the accompanying drawing wherein:

Fig. 1 is a schematic diagram embodying one form of the invention used in the elevator control channel of a flight control system; and Fig. 2 is a graph showing the relation between the force applied by the human pilot and the control stick movement.

Referring to the drawing wherein like numerals are used to indicate like parts throughout, this invention in one form comprises control means for controlling an aircraft, a preferred embodiment being shown as a control stick 12 attached to a control column 10. The control means develops a signal of desired magnitude and polarity to cause a movement of a control surface of the aircraft, thereby controlling such aircraft. As shown in the preferred embodiment the control stick 12 is connected to a force sensor which is shown in the form of a potentiometer 14 connected across a voltage source 16. The arm or slider 18 of potentiometer 14 is attached to control stick 12 so that movement of the stick 12 will move the slider 18 in one direction or another from center tap 20 to develop a command signal which varies in polarity and magnitude according to the movement of stick 12. The signal from the force sensor which is taken between arm 18 and center tap 20 excites a variable means, shown as a rotor coil or winding 22 of a resolver or selsyn 24. Added to the signal from the force sensor is a fixed potential taken from resistor 26 placed across a voltage source 28. The relationship between the fixed potential taken from resistor 26 and the maximum signal that can be developed across potentiometer 14 is such that their total will not cause a maneuver of the aircraft (not shown) that will exceed the safe structural limits of such aircraft. The need for the fixed potential across resistor 26 will become apparent later in this description.

The excitation of rotor winding 22 of resolver 24 induces a proportional voltage in inductively coupled stator winding 30. A servo amplifier 32 is operated by the voltage induced in stator winding 30. The servo amplifier 32 energizes servo motor 34 which is mechanically connected to elevators 36 through appropriate gearing (not shown). Elevators 36 are moved to the proper position by the turning of servo motor 34. To insure the proper positioning of elevators 36 a follow-up or feedback 38 is provided. The follow-up 38 is actuated by shaft 40 connected to servo motor 34 so that it generates or develops a signal in opposition to the voltage induced in stator winding 30 and proportional to the displacement of elevators 36. A tachometer 42 is provided to prevent hunting of elevators 36 in a manner well known in the art. The tachometer 42 is connected to servo motor 34 by shaft 40a and generates a signal proportional to the rate of movement of the elevators 36.

To provide the proper "feel" for the human pilot the control stick 12 is fixed to control column 10, as at 13, and extends upwardly through slot 15 in the control column 10. The control column 10 is movably secured to the aircraft (not shown) by means of a universal joint 44. The control column 10 is also operatively connected to the servo motor 34, for example by mechanical link 45, having one end connected to the control column at 46. The other end of link 45 is connected to a bar 47 which is fixed to a gear 48, for rotation therewith. Gear 48 meshes with a gear 49, rotatably connected to servo motor 34 through a shaft 40b. Thus, the control column 10 is operatively connected to move with rotation of the servo, while the control stick 12 can move a limited distance within the control column 10. Therefore, when a force is exerted on the control stick 12 it bends about fixed point 13, setting up a bending stress in the stick 12. As stick 12 is bent it moves the slider 18 in one direction or another along the potentiometer 14, developing a signal or voltage between slider 18 and center tap 20. This signal, plus the fixed potential from resistor 26, energizes servo motor 34, through resolver 24 and servo amplifier 32, causing gear 49 to rotate. The gear 49 drives gear 48 and through bar 47 and link 45 the column 10 is moved, in the same direction as the force applied to control stick 12. As long as the force exerted on control stick 12 remains the same, the stick 12 moves with control column 10, retaining the bend in control stick 12 and continuing to develop the signal.

The control stick 12 is so designed that as it is bent a greater force is required to bend it further. Thus, for movement of the control stick 12 across the potentiometer 14 increasing force is required. The force required to move the control stick 12 across the potentiometer 14 varies as shown in Figure 2, providing the human pilot with a proportionate "feel" system. That is, the larger the force exerted by the pilot, the more pronounced is the maneuver of the aircraft. As shown by Fig. 2, a predetermined force $oa$ is required to move the control stick 12 a distance $ox$. Of course, the distance $ox$ is the limited movement of control stick 12 from center tap 20 to either end of potentiometer 14. To move the control stick 12 beyond the limited distance $ox$ requires a substantial increase in the force exerted by the human pilot, illustrated as $aa_1$. Since the maximum signal developed across potentiometer 14 plus the fixed potential from resistor 26 provides the maximum safe maneuver of the aircraft, the substantial increase in force required to further move control stick 12 gives the human pilot ample warning that he is attempting an unsafe maneuver. The increased force required to execute an unsafe maneuver is provided by the design of the manual control system.

As control stick 12 is moved in either direction in slot 15 to develop a maximum signal from potentiometer 14 it will be positioned against one end 15a of slot 15 or the other end 15b. The signal developed plus the potential from resistor 26 will energize servo motor 34 and move elevators 36 to their maximum safe deflection. As the servo motor 34 rotates the shaft 40 causes feedback or follow-up 38 to develop a signal proportional to the displacement of the elevators 36 and shaft 40a causes tachometer 42 to generate a signal proportional to the rate of displacement of the elevators, as is well known in the art. These signals are in opposition to the signal from potentiometer 14 and resistor 26. When the elevators 36 are in their maximum safe position, the signal from follow-up 38 is equal to the signal from potentiometer 14 and resistor 26 and the tachometer signal is zero. Thus, there is no signal to energize the servo motor 34 and it stops rotating. If the human pilot should continue to pull or push the control stick 12, he would have to move control column 10 about universal joint 44 and through link 45, bar 47, gears 48 and 49 and shaft 40b, rotate the servo motor 34. Any movement of servo motor 34 to cause a further displacement of elevators 36 would also cause an increase in the signal from follow-up 38. The increased signal from follow-up 38 would then be fed through the servo amplifier 32 to energize the servo motor 34 and attempt to return the elevators 36 to the position where the follow-up signal was equal to the signal induced in stator winding 30. This system can be designed to provided as great an increase of force as desired to warn the human pilot of the unsafe maneuver.

It should be expressly understood that the manual control system described is by way of illustration only since it is obvious to those skilled in the art that a hydraulic or an electrical system could be substituted, or any combination of such systems.

As is well known to those familiar with the aircraft art or aerodynamics it is relatively simple to calculate the maximum stress or load that can be safely borne by the wings of a given aircraft. The load or stress that is built up on the wings of an aircraft is often referred to as the "g-load" on the aircraft. It is also well known that for many maneuvers of an aircraft the g-load varies with the flight conditions of the aircraft. For example, as the speed of an aircraft increases the g-load also increases for a given elevator input. Therefore, while it is possible to adjust the maximum signal from potentiometer 14 such that together with the fixed potential taken from resistor 26 the total signal would not provide an elevator deflection that would maneuver the aircraft beyond its structural limit at the most critical flight condition, such limitation would unduly restrict maneuvering at non-critical flight conditions. To prevent such restriction on maneuvering the potentiometer 14 is designed so that its maximum voltage will provide safe maneuvering at normal aircraft flight conditions. However, so that the human pilot would not maneuver beyond safe limits during other flight conditions a "g-sensing" circuit is included in the above-described limiter.

The "g-sensing" circuit comprises a normal accelerometer 50, that is an accelerometer which senses acceleration at right angles to the aircraft wings (not shown). The accelerometer 50 generates a signal proportional to such normal acceleration, and since this normal acceleration is proportional to the "g-load" on the wings (not shown) the accelerometer 50 generates a signal proportional to the "g-load" on the aircraft. The signal from accelerometer 50 is fed to an amplifier 52 in opposition to the signal from potentiometer 14, which is also fed to the amplifier 52. The resultant of these signals energizes the position servo motor 54 which is connected to turn rotor winding 22 of resolver 24 through shaft 56 and appropriate gearing (not shown). As motor 54 is energized it turns rotor winding 22 to increase or decrease the signal induced in the inductively coupled stator winding 30. If the signal generated by accelerometer 50 is greater than the signal developed across potentiometer 14 it indicates that the "g-loading" is increasing too rapidly and that the maneuver would be unsafe. Therefore, the motor 54 will turn rotor winding 22 so as to decrease the signal induced in stator winding 30, thus preventing an unsafe deflection of the elevators 36. However, if the signal generated by accelerometer 50 is less than the signal developed across potentiometer 14, then the "g-loading" on the aircraft is under its structural limits and the motor 54 will turn the rotor winding 22 to increase the signal induced in stator winding 30, allowing a greater deflection of elevators 36. Of course, when the signal generated by accelerometer 50 equals the signal developed across potentiometer 14, the "g-loading" on the aircraft is just within the structural limits of the aircraft and the motor 54 will not be energized.

As an example of the operation of the present invention, assume that the human pilot wishes to maneuver the aircraft into a steep climb. The human pilot pulls the control stick 12 toward him to cause the elevators 36 to be displaced upward. Movement of control stick 12 moves arm 18 across potentiometer 14 to develop a signal of the proper polarity to cause an upward movement of the elevators 36. This signal is added to the fixed potential taken from resistor 26 and excites the rotor winding 22 of resolver 24. The excitation of rotor winding 22 induces a signal or voltage in stator winding 30, which operates servo amplifier 32. Servo amplifier 32 energizes servo motor 34 which begins to rotate and move the elevators 36 upward. As servo motor 34 rotates it actuates follow-up 38, which develops a signal proportional to the displacement of elevators 36 in opposition to the signal induced in stator winding 30. The tachometer 42 is also actuated by servo motor 34 and generates a signal proportional to the rate of movement of elevators 36, in opposition to the signal from stator winding 30. As the elevators 36 move closer to the desired displacement the signal or voltage from tachometer tends to go to zero and the signal from follow-up 38 becomes almost equal to the signal from stator winding 30. When the elevators 36 have reached the desired position the signal from tachometer 42 is zero and the signal from follow-up 38 is equal to that induced in stator coil 30.

As the aircraft (not shown) maneuvers into its climb attitude in response to the upward movement of elevators 36, the acceleration normal to the wings (not shown) is sensed by normal accelerometer 50. The accelerometer 50 generates a signal which is fed into servo amplifier 52 in opposition to the signal developed across potentiometer 14. The resultant of these two signals energizes position servo motor 54. When position servo motor 54 is energized it turns rotor winding 22 through shaft 56, so as to either increase or decrease the coupling between rotor winding 22 and stator winding 30. If the signal from accelerometer 50 is larger than the signal from potentiometer 14 it means that the aircraft is maneuvering into a climb which will exceed the structural limit of the aircraft under the flight conditions at which it is maneuvering. Therefore, the coupling between rotor coil 22 and stator coil 30 will be decreased by the energization of position servo motor 54. This decreased coupling will result in a smaller signal being induced in stator winding 30 and thus prevent a larger displacement of the elevators 36. Conversely, if the signal from potentiometer 14 is greater than the signal generated by accelerometer 50, the maneuver is under the structural limit of the aircraft and the motor 54 will be energized to turn rotor winding 22 so as to increase its coupling with stator winding 30. Obviously, as the elevators are moved so as to increase or decrease the rate of climb the signal generated by accelerometer 50 is increased or decreased until it is equal to the signal developed across potentiometer 14. Thus, it is seen that the "g-sensing" circuit controls the resolver 24 to prevent the passing of a signal of sufficient strength to cause a maneuver that would exceed the structural limit of the aircraft for the flight condition of the aircraft. However, should the human pilot desire to maneuver the aircraft beyond such safe limit he may override the limiting control by exerting sufficient force on the control stick 12 to pivot control column 10 about pivot point 44, which would cause the rotation of servo motor 34 through link 45, bar 47, gears 48 and 49, and shaft 40b, so as to maneuver beyond the controlled limits. It should be noted that the human pilot would have adequate warning that such maneuver was unsafe by the force required to obtain it.

The above-described maneuver limiter also functions with an automatic pilot to prevent the automatic pilot means from placing an aircraft in an unsafe maneuver. When used with an automatic pilot, a control means shown as director 60, for example a pitch rate gyro, is provided which generates a signal proportional to a deviation of the aricraft (not shown). This signal is fed to the rotor coil 22 of resolver 24, and induces a proportional signal in stator winding 30. The signal in stator winding 30 is fed through amplifier 32 to energize motor 34 to cause a movement of elevators 36 to oppose such deviation. This is the usual operation of an automatic pilot. However, in order to prevent the director 60 from sending a signal into the elevator channel which would cause a maneuver in excess of the structural limit of the aircraft a diode limiter 62 is provided to limit the signal from the director 60 to a predetermined amount, which is fixed according to the aircraft on which it is used. A diode limiter similar to that used in this invention is disclosed in the copending application of James M. Cooper, for "Signal Voltage Amplitude Limiter and Phase Discriminator," Serial No. 282,497, filed April 15, 1952, and assigned to the same assignee as the present invention.

The diode limiter 62 comprises a pair of oppositely poled diodes or rectifiers 64 and 66 connected to the output of director 60. A bias voltage is placed on the diodes or rectifiers 64 and 66 by resistors 68 and 70, respectively, such that the diodes or rectifiers 64 and 66 are nonconducting to any signal less than the bias voltage. However, when the signal generated by the director 60 is greater than the bias voltage either of diodes 64 or 66 will start conducting, depending on the polarity of the signal and effectively limit the signal to the same strength or amplitude as the bias voltage. Thus, regardless of the signal generated by the director 60, the elevator channel will not receive a signal stronger than the bias voltage of the diode limiter. The bias on diodes or rectifiers 64 and 66 would be fixed at the same value as the strongest signal possible from the potentiometer 14. Of course, the "g-sensing" circuit will function in the same manner with a signal from director 60 as it does with a signal from potentiometer 14.

To prevent the automatic pilot or director 60 from sending a signal into the control channel while the human pilot is on manual control an automatic switch 72 is provided. In normal hands off flight, contacts 73 of switch 72 are closed and the automatic pilot is engaged. However, when the human pilot moves the control stick 12 in either direction within slot 15 of control column 10, contact 75 on the control stick 12 engages either contact 76 or 77, which are spring mounted on control column 10. When contact 75 engages either contact 76 or 77, solenoid 78 is energized through voltage source 16. The energization of solenoid 78 operates the switch 72 to open contacts 73 and close contacts 74. This automatic switching removes the automatic pilot from the control channel and places the center tap 20 and slider 18 of potentiometer 14 in the control channel.

When the maneuver limiter described above is used on the elevator channel it is necessary to provide a fixed potential taken across resistor 26. As is well known in the aerodynamics art if an aircraft were able to fly at an infinite speed there would be zero elevator displacement for level flight. However, since all aircraft fly at some finite speed it is necessary to provide some elevator deflection for level flight. This deflection is provided by the fixed potential taken across the resistor, which is adjusted for the particular aircraft by known methods of calculation. Of course, when the maneuver limiter is used for some channel other than the elevator channel it is not necessary to provide the fixed potential.

In the particular example illustrated, the invention is described as applied to the elevator control channel. However, it is obvious that it can readily be applied to any other control channel of the aircraft.

By use of this invention the pilot is able to retain his "feel" of the aircraft and obtain adequate warning when he is approaching an unsafe maneuver. Further, the maneuver limiter, while preventing the automatic pilot from performing an unsafe maneuver, does not prevent the human pilot from performing an unsafe maneuver should it become necessary or desirable to do so. It merely provides an early warning so that such maneuvers can be avoided.

Various modifications will appear obvious to those skilled in the art. The various components shown and described are by way of example only, since it is obvious that many substitutions may be made without departing from the spirit and scope of the invention as defined in the appended claims.

What is claimed as new and which is desired to secure by Letters Patent is:

1. A maneuver limiter for an aircraft having a movable control surface comprising control means for controlling said aircraft, a first signal developed by said control means to cause movement of said movable control surface, a servo, means including a rotatable winding for feeding said first signal to said servo, said servo being connected to move said control surface, acceleration sensing means for generating a second signal in response to movement of said aircraft caused by movement of said control surface, a motor connected to rotate said rotatable winding, means for energizing said motor by the difference between said first and second signals, whereby the signal fed to said servo is varied to limit movement of said control surface when said second signal is greater than said first signal.

2. In an aircraft having a movable control surface, a maneuver limiter comprising manual control means for manual control of said aircraft, means developing a command signal proportional to the movement of said manual means, a servo, coupling means including a movable part for feeding said command signal to said servo, said servo being connected to move said movable control surface, acceleration sensing means for generating a signal in response to movement of said aircraft caused by movement of said control surface, a motor connected to move said movable part of said coupling means, means for energizing said motor by the difference between said command signal and said generated signal, whereby the signal fed to said servo is varied to limit movement of said control surface when said generated signal is greater than said command signal.

3. A maneuver limiter for an aircraft having a control surface comprising manual means by which the human pilot controls said aircraft, a force sensor actuated by said manual means to generate a first signal proportional to the movement of said manual means, a servo, inductively coupled windings for feeding said signal to said servo, one of said inductively coupled windings being movable, means connecting said servo to move said control surface, acceleration sensing means for generating a second signal in response to the movement of the aircraft caused by movement of said control surface, a motor connected to move said movable winding, means for energizing said motor by the difference between said first and second signals, whereby the signal to said servo is varied to limit movement of said control surface when said second signal is greater than said first signal.

4. In an aircraft having a movable control surface controllable by an automatic pilot, a maneuver limiter comprising automatic control means for developing a control signal to cause movement of said control surface, a servo, inductive means having a movable part for feeding said control signal to said servo, said servo being connected to move said control surface, acceleration sensing means for generating a signal in response to movement of said airplane caused by movement of said control surface, a motor connected to move said movable part of said inductive means, means for energizing said motor by the difference between said control signal and said generated signal, whereby the signal fed to said servo is varied to limit movement of said control surface when said generated signal is greater than said control signal.

5. In an aircraft having a movable control surface adapted to be moved selectively by a human pilot and an automatic pilot, a maneuver limiter adapted to warn the human pilot, when manually controlling the aircraft, of a dangerous maneuver and to prevent the automatic pilot from performing a dangerous maneuver, said maneuver limiter comprising a manual control means for manual control of said aircraft, an automatic control means for developing an automatic control signal to provide automatic control of said aircraft, switching means for selecting manual or automatic control, said switching means normally providing automatic control and including means responsive to movement of said manual control means to provide manual control, means for developing a manual control signal proportional to a limited movement of said manual control means, a predetermined force being required to cause said limited movement of said manual control means, limiter means for limiting said automatic control signal to a predetermined safe value for said aircraft, a servo adapted to actuate said movable control surface, means to energize said servo by one of said control signals according to the control provided by said switching means, means operatively linking said manual control means to said servo whereby, when said manual control means is controlling, said servo will be energized by said manual control signal for said limited movement, and a force substantially greater than said predetermined force is required to move said manual control means beyond said limited movement, and when said automatic control means is controlling, said automatic control signal is limited to a safe value.

6. A maneuver limiter for an aircraft having a movable control surface comprising manual control means and automatic control means for selectively controlling said aircraft, switching means providing automatic control when in one position and being actuated to a second position by movement of said manual control means to provide manual control, means developing a manual control signal proportional to movement of said manual control means, said automatic control means developing an automatic control signal, a servo, means including a rotatable winding for feeding a selected one of said control signals to said servo, said servo being connected to move said movable control surface, an acceleration sensing means for generating a signal in response to movement of said aircraft caused by movement of said control surface, a motor connected to rotate said rotatable winding, means for energizing said motor by the difference between said selected control signal and said generated signal, whereby the signal fed to said servo is varied to limit movement of said control surface when said generated signal is greater than said selected control signal.

7. A maneuver limiter for an aircraft having a movable control surface comprising an automatic control means for developing a control signal, a limiter for limiting said control signal to a predetermined safe value, a servo connected to move said movable control surface, means for feeding said limited control signal to said servo, said feeding means including a variable coupling means, and acceleration sensing means for generating a signal in response to movement of said aircraft caused by movement of said control surface, said variable coupling means being varied by the difference between said limited controlled signal and said generated signal, whereby the movement of said control surface is limited by said limited control signal when said generated signal is not greater than said limited control signal.

8. In an aircraft having a movable control surface a maneuver limiter comprising an automatic control means for developing a control signal, a limiter for limiting said control signal to a predetermined safe value for normal flight conditions, a servo connected to move said movable control surface, means including a movable part for feeding said limited control signal to said servo, acceleration sensing means for generating a signal in response to movement of said aircraft caused by movement of said control surface, a motor connected to move said movable part, means for energizing said motor by the difference between said limited control signal and said generated signal whereby the movement of said control surface is limited by said limited control signal when said generated signal is not greater than said limited control signal and the signal fed to said servo is varied to limit movement of said control surface when said generated signal is greater than said limited control signal.

9. In a maneuver limiter for an aircraft having a movable control surface, a servo for moving said movable control surface, inductive means having a rotatable winding for feeding a control signal to said servo, a force sensor for developing said control signal, manual control means for actuating said force sensor, a motor connected to rotate said rotatable winding, an acceleration sensing means for generating a signal in response to a movement of said aircraft caused by movement of said movable surface, and means to energize said motor by the difference between said generated signal and said control signal whereby when said generated signal is greater than said control signal said rotatable winding is rotated to decrease the signal fed to said servo.

10. In a maneuver limiter for an aircraft having a movable control surface, a servo for moving said movable control surface, inductive means having a rotatable winding for feeding a control signal to said servo, a force sensor for developing said control signal, manual control means, limited movement of said manual control means by a predetermined force actuating said force sensor, means operatively linking said servo and said manual control means, a motor connected to rotate said rotatable winding, an acceleration sensing means for generating a signal in response to a movement of said aircraft caused by movement of said control surface means to energize said motor by the difference between said generated signal and said control signal whereby said servo is energized by said control signal for said limited movement of said manual control means and a force greater than said predetermined force is required to move said manual control means beyond said limited movement, and when said generated signal is greater than said control signal said rotatable winding is rotated to decrease the signal fed to said servo.

References Cited in the file of this patent

UNITED STATES PATENTS

| | | |
|---|---|---|
| 2,408,770 | Frische et al. | Oct. 8, 1946 |
| 2,604,613 | Klass | July 22, 1952 |
| 2,623,717 | Price | Dec. 30, 1952 |
| 2,663,001 | Rusler et al. | Dec. 15, 1953 |
| 2,751,543 | Alderson | June 19, 1956 |
| 2,801,059 | Hecht et al. | July 30, 1957 |
| 2,808,999 | Chenery | Oct. 8, 1957 |